(12) United States Patent
Toji

(10) Patent No.: US 12,260,617 B2
(45) Date of Patent: Mar. 25, 2025

(54) OBJECT DETECTION DEVICE, OBJECT DETECTION METHOD, PROGRAM, AND RECORDING MEDIUM

(71) Applicant: Konica Minolta, Inc., Tokyo (JP)

(72) Inventor: Bumpei Toji, Hashima (JP)

(73) Assignee: Konica Minolta, Inc., Tokyo (JP)

(*) Notice: Subject to any disclaimer, the term of this patent is extended or adjusted under 35 U.S.C. 154(b) by 400 days.

(21) Appl. No.: 17/605,473

(22) PCT Filed: Apr. 15, 2020

(86) PCT No.: PCT/JP2020/016570
§ 371 (c)(1),
(2) Date: Oct. 21, 2021

(87) PCT Pub. No.: WO2020/235269
PCT Pub. Date: Nov. 26, 2020

(65) Prior Publication Data
US 2022/0207863 A1    Jun. 30, 2022

(30) Foreign Application Priority Data
May 23, 2019    (JP) .................................. 2019-096592

(51) Int. Cl.
*G06K 9/66* (2006.01)
*G06V 10/25* (2022.01)
(Continued)

(52) U.S. Cl.
CPC ............ *G06V 10/765* (2022.01); *G06V 10/25* (2022.01); *G06V 10/82* (2022.01)

(58) Field of Classification Search
CPC ...... G06V 10/765; G06V 10/25; G06V 10/82; G06V 40/10; G06V 10/764; G06V 20/64;
(Continued)

(56) References Cited

U.S. PATENT DOCUMENTS

2016/0070976 A1*  3/2016  Aoba ................... G06V 10/776
                                                382/180
2017/0185985 A1*  6/2017  Harada ................... G06F 18/28
(Continued)

FOREIGN PATENT DOCUMENTS

JP    2011-138387 A    7/2011
JP    2013-12163 A    1/2013
(Continued)

OTHER PUBLICATIONS

Extended European Search Report (EESR) dated Jun. 22, 2022 for European Patent Application No. 20810214.5.
(Continued)

*Primary Examiner* — Duy M Dang
(74) *Attorney, Agent, or Firm* — RANKIN, HILL & CLARK LLP

(57) ABSTRACT

An object position region detection unit of an object detection device detects a position region of an object included in an input image on the basis of a first class definition in which a plurality of classes is defined in advance. A class identification unit identifies a class out of a plurality of classes to which the object belongs on the basis of the first class definition. An object detection result output unit outputs class information of the object as a detection result of the object on the basis of a second class definition in which a plurality of classes is defined in advance, the second class definition associated with the first class definition. The number of classes defined in the second class definition is smaller than the number of classes defined in the first class definition.

19 Claims, 5 Drawing Sheets

(51) Int. Cl.
*G06V 10/764* (2022.01)
*G06V 10/82* (2022.01)

(58) Field of Classification Search
CPC ............ G06F 16/5854; G06F 18/2431; G06F 18/285; G06N 3/045; G06N 3/084; G06T 2207/20081; G06T 2207/20084; G06T 7/70
See application file for complete search history.

(56) References Cited

U.S. PATENT DOCUMENTS

| | | | |
|---|---|---|---|
| 2019/0102646 A1* | 4/2019 | Redmon | G06V 20/20 |
| 2019/0205643 A1* | 7/2019 | Liu | G06N 3/045 |
| 2022/0215648 A1* | 7/2022 | Toji | G06V 10/764 |

FOREIGN PATENT DOCUMENTS

| | | |
|---|---|---|
| JP | 2018-513491 A | 5/2018 |
| JP | 2018-526723 A | 9/2018 |
| JP | 2019-16298 A | 1/2019 |
| JP | 2019-32773 A | 2/2019 |
| JP | 2019032773 A | 2/2019 |
| JP | 2019-36167 A | 3/2019 |
| JP | 2019-49604 A | 3/2019 |
| JP | 2019036167 A | 3/2019 |
| JP | 2019049604 A | 3/2019 |
| WO | 2015/147333 A1 | 10/2015 |
| WO | 2017/066543 A1 | 4/2017 |

OTHER PUBLICATIONS

International Search Report (ISR) dated Jul. 14, 2020 filed in PCT/JP2020/016570 and its English trasnlation.
PCT Written Opinion of the International Searching Authority dated Jul. 14, 2020 filed in PCT/JP2020/016570 and its English trasnlation.
Japanese Office Action (JPOA) dated Dec. 13, 2023 issued in Japanese patent application No. 2021-520656 and its English machine translation.
Japanese Office Action (JPOA) issued on Aug. 8, 2023 and issued in Japanese Patent Application No. 2021-520656 and its English machine translation.
European Office Action (EPOA) dated Jul. 2, 2024 for European Patent Application No. 20810214.5.

* cited by examiner

OBJECT DETECTION DEVICE, OBJECT DETECTION METHOD, PROGRAM, AND RECORDING MEDIUM

TECHNICAL FIELD

The present invention relates to an object detection device, an object detection method, a program, and a recording medium that detect, from an input image, an object included in the input image.

BACKGROUND ART

A technology for detecting an object included in an input image has been conventionally developed. Object detection is an important technology for realizing a function as an eye of a robot. Research regarding the object detection has been performed from object detection in which a detection target is specified, such as detection of a face or a person from an image. In recent years, a technology for detecting an object by using machine learning and deep learning has also been proposed (refer to, for example, Patent Literatures 1 to 5).

CITATION LIST

Patent Literature

Patent Literature 1: JP 2019-16298 A
Patent Literature 2: JP 2013-12163 A
Patent Literature 3: JP 2011-138387 A
Patent Literature 4: JP 2018-526723 A
Patent Literature 5: JP 2018-513491 A

SUMMARY OF INVENTION

Technical Problem

In a case where machine learning is used, by allowing an object position region detection unit that detects a position region of an object included in an image and a class identification unit that identifies a class (type) of the above-described object to learn in advance by using a variety of data (in multiple classes), it becomes possible to detect objects in multiple classes at the time of inference. However, there is a case where directly outputting a detection result of the objects in multiple classes is not effective depending on applications.

For example, in a traffic census based on an image of a road, in a case where a purpose is only to count each of "person", "vehicle", and "animal" as objects passing through the road, it is necessary to detect a large class of "person", "vehicle", and "animal", and at that time, it is not necessary to distinguish "car", "bus", and "truck", which are small classes of "vehicle", for example. Therefore, in such applications, it is not effective to output a detection result regarding objects in fine multiple classes (information such as "car" and "bus" in the above-described example).

In contrast, by allowing the above-described object position region detection unit and class identification unit to learn in advance by using data with few classes, it is possible to detect an object regarding the few classes at the time of inference and output a detection result. It may be also considered that such a learning method is suitable for the above-described applications not requiring the detection result of the objects in fine multiple classes. However, in this case, since the number of classes of data at the time of learning is small, a detection performance of an object at the time of inference is deteriorated.

For example, a case where the object position region detection unit and the class identification unit are allowed to learn so as to detect three classes of "person", "vehicle", and "animal" from an input image is considered. In this case, for example, it is necessary to allow them to learn "bird" and "dog" as the same "animal" class. However, since there are few common characteristics between "bird" and "dog", it is difficult to allow them to learn "bird" and "dog" as the same "animal" class. For this reason, it is difficult to recognize (identify) "bird" and "dog" as the same "animal" class at the time of inference, and as a result, the detection performance of the object is deteriorated.

Then, in the applications in which the detection result of the objects in fine multiple classes is not required, there is a need for a technology for improving the detection performance of the objects having few common characteristics while enabling object detection with rough small classes. However, such technology has not yet been proposed also in Patent Literatures 1 to 5.

The present invention has been achieved to solve the above-described problems, and an object thereof is to provide an object detection device, an object detection method, a program, and a recording medium that may improve a detection performance of an object by performing detection of a position region and object detection based on class identification with fine multiple classes and that are suitable for applications not requiring a detection result of an object in units of fine multiple classes.

Solution to Problem

An object detection device according to an aspect of the present invention is provided with an object position region detection unit that detects, from an input image, a position region of an object included in the image on the basis of a first class definition in which a plurality of classes is defined in advance, a class identification unit that identifies a class out of the plurality of classes to which the object belongs on the basis of the first class definition, and an object detection result output unit that outputs a detection result of the object on the basis of a detection result of the object position region detection unit and an identification result of the class identification unit, in which the object detection result output unit outputs class information of the object as the detection result of the object on the basis of a second class definition in which a plurality of classes is defined in advance, the second class definition associated with the first class definition, and the number of classes defined in the second class definition is smaller than the number of classes defined in the first class definition.

An object detection method according to another aspect of the present invention is provided with an object position region detection step of detecting, from an input image, a position region of an object included in the image on the basis of a first class definition in which a plurality of classes is defined in advance, a class identification step of identifying a class out of the plurality of classes to which the object belongs on the basis of the first class definition, and an object detection result output step of outputting a detection result of the object on the basis of a detection result of the object position region detection step and an identification result of the class identification step, in which at the object detection result output step, class information of the object is output as the detection result of the object on the basis of a second class definition in which a plurality of classes is defined in advance, the second class definition associated with the first class definition, and the number of classes defined in the second class definition is smaller than the number of classes defined in the first class definition.

A program according to still another aspect of the present invention is a program for allowing a computer to execute the above-described object detection method.

A recording medium according to still another aspect of the present invention is a computer-readable recording medium in which the above-described program is recorded.

Advantageous Effects of Invention

The number of a plurality of classes defined in a first class definition is relatively large as compared to the number of classes defined in a second class definition, and in the first class definition, a plurality of classes is finely defined. Therefore, it becomes possible to detect a position region of an object and identify a class with fine multiple classes on the basis of the first class definition. As a result, it becomes possible to perform the object detection with fine multiple classes, and improve a detection performance of the object.

The second class definition is associated and correlated with the first class definition, and the number of classes defined in the second class definition is smaller than the number of classes defined in the first class definition. For this reason, it becomes possible to output a detection result of the object in units of few classes on the basis of the second class definition. Therefore, it is possible to realize an object detection device or an object detection method suitable for applications not focusing on the detection performance in units of fine multiple classes.

DESCRIPTION OF EMBODIMENTS

An embodiment of the present invention is described as follows with reference to the drawings.
[1. Configuration of Object Detection System]

Figure 1:
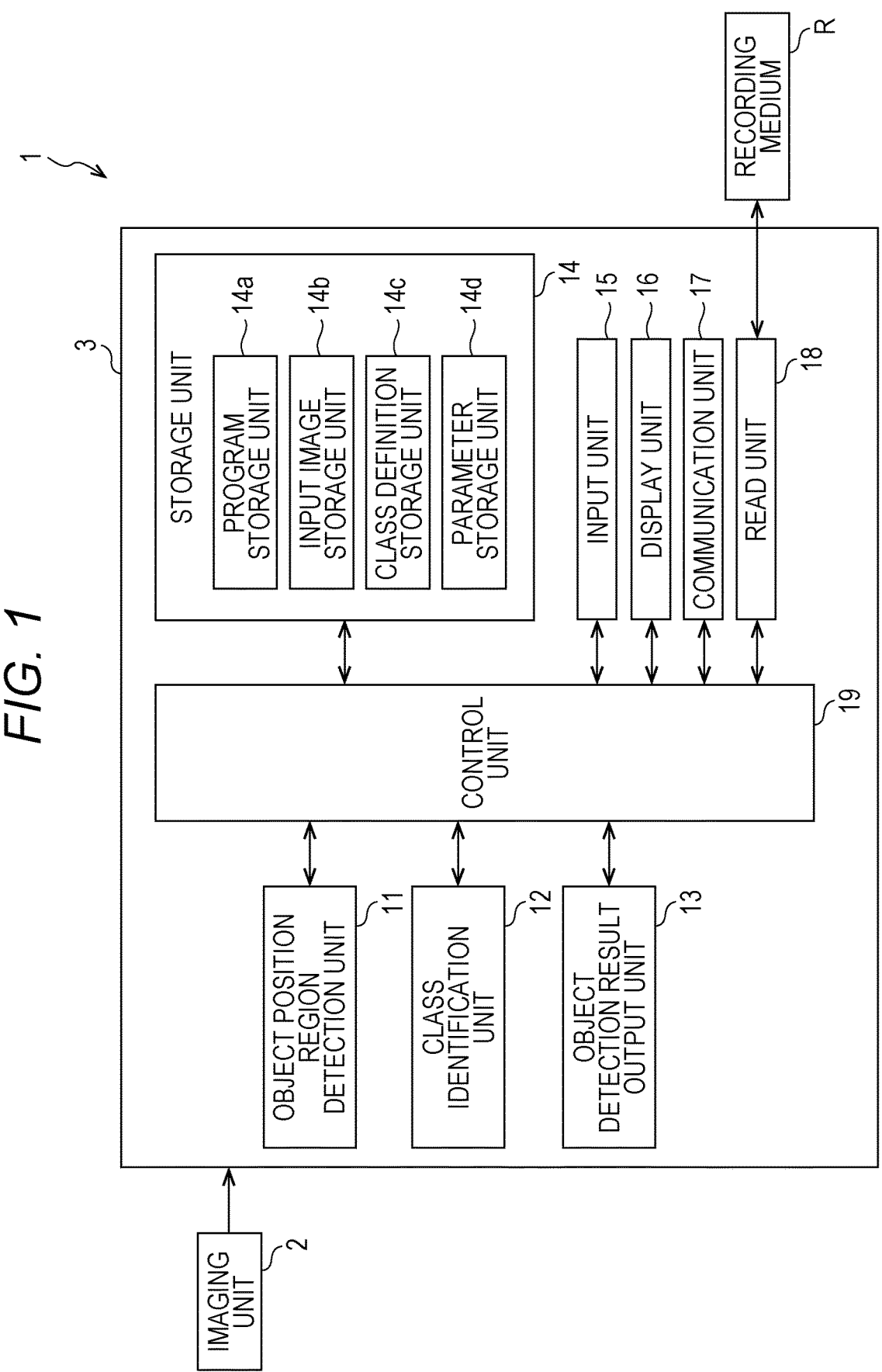
FIG. 1 is a block diagram schematically illustrating an entire configuration of an object detection system according to an embodiment of the present invention.

FIG. 1 is a block diagram schematically illustrating an entire configuration of an object detection system 1 according to this embodiment. The object detection system 1 includes an imaging unit 2 and an object detection device 3. The imaging unit 2 is formed of a camera that images an object to acquire an image. The above-described image is, for example, a moving image, but may also be a still image. The number of imaging units 2 included in the object detection system 1 is not especially limited, and one or a plurality of imaging units 2 may be included.

The imaging unit 2 is communicably connected to the object detection device 3 via a communication line such as a wired cable or a local area network (LAN). Note that, the imaging unit 2 may be configured to be able to wirelessly communicate with the object detection device 3. In any case, data of the image acquired by imaging by the imaging unit 2 is transmitted to the object detection device 3 via the communication line.

The object detection device 3 is formed of, for example, a personal computer (PC). The object detection device 3 includes an object position region detection unit 11, a class identification unit 12, an object detection result output unit 13, a storage unit 14, an input unit 15, a display unit 16, a communication unit 17, a read unit 18, and a control unit 19. The control unit 19 is formed of a central processing unit (CPU) that controls an operation of each unit of the object detection device 3, and operates according to an operation program stored in a program storage unit 14a of the storage unit 14.

The object position region detection unit 11 detects, from an input image, a position region of an object included in the image on the basis of a first class definition in which a plurality of classes is defined in advance. Herein, the "input image" may be considered to be, for example, an image input from the imaging unit 2 to the object detection device 3, but is not limited to this image; in addition, an image input from an external terminal device or server to the object detection device 3 via a communication line may also be considered.

The object position region detection unit 11 is formed of, for example, a graphics processing unit (GPU). The GPU is an arithmetic device (processor) specialized in real-time image processing. By forming the object position region detection unit 11 of the GPU, it becomes possible to construct a neural network capable of performing machine learning such as a convolutional neural network (CNN) in the GPU and allow this neural network to serve as the object position region detection unit 11.

In this embodiment, for example, 10 classes are defined as the above-described first class definition. The above-described 10 classes are, for example, "person (with head)", "person (without head) (with head hidden)", "car", "bus", "truck", "dog", "cat", "horse", "bear", and "bird". The object position region detection unit 11 is allowed to learn in advance to detect a position region of an object that might belong to the class defined in the first class definition from the input image (a parameter (weight) of each node forming the CNN is set in advance). As a result, when an image is actually externally input, the object position region detection unit 11 may detect a position region of an object like "car", for example, from the input image on the basis of the first class definition.

The class identification unit 12 identifies a class out of a plurality of classes to which the object included in the input image belongs on the basis of the above-described first class definition. As is the case with the object position region detection unit 11, such class identification unit 12 is formed of a GPU. As a result, it becomes possible to construct a neural network capable of performing machine learning such as a CNN in the GPU and allow this neural network to serve as the class identification unit 12.

The class identification unit 12 is allowed to learn in advance to identify the class to which the object included in the input image belongs on the basis of the first class definition (a parameter (weight) of each node forming the CNN is set in advance). As a result, when an image is actually externally input, the class identification unit 12 may identify, on the basis of the first class definition, the class out of the classes defined in the first class definition to which the object included in the input image (including the object of which position region is already detected by the object position region detection unit 11) belongs.

In this embodiment, since the class identification unit 12 is formed of the CNN, not only an identification result of the class to which the object belongs but also a score indicating likelihood (certainty) of the class is output from the class identification unit 12. For example, information (class information with score) that the certainty that the object is "person (with head)" is 0.8 and the like is output from the class identification unit 12.

The object detection result output unit 13 outputs a detection result of the object on the basis of a detection result of the object position region detection unit 11 and the identification result of the class identification unit 12. For example, the object detection result output unit 13 outputs information of the position region of the object detected by the object position region detection unit 11 and information of the class identified by the class identification unit 12. Such object detection result output unit 13 is formed of, for example, the same CPU as or a different CPU from that of the control unit 19.

In this embodiment, the object detection result output unit 13 outputs class information of the object as the detection result of the object on the basis of a second class definition in which a plurality of classes is defined in advance.

Herein, in the above-described second class definition, for example, three classes are defined. The above-described three classes are, for example, "person", "vehicle", and "animal". Therefore, the number of classes (three) defined in the second class definition is smaller than the number of classes (10) defined in the first class definition.

In addition, "person" defined in the second class definition is a class (superordinate concept class) including "person (with head)" and "person (without head)" defined in the first class definition. In addition, "vehicle" defined in the second class definition is a class including "car", "bus", and "truck" defined in the first class definition. Furthermore, "animal" defined in the second class definition is a class including "dog", "cat", "horse", "bear", and "bird" defined in the first class definition. Therefore, it may be said that each class defined in the first class definition and each class defined in the second class definition are associated (correlated) with each other, and the first class definition and the second class definition are associated with each other.

Since the object detection result output unit 13 outputs the class information of the object as the detection result of the object on the basis of the second class definition, when the information that certainty that the object is "person (with head)" is 0.8 and certainty that the object is "car" is 0.2 is output from the class identification unit 12, for example, this outputs the class information that the class of the above-described object is "person" (inclusive concept of "person (with head)") as the detection result of the object.

The storage unit 14 is a memory that stores various types of information, and formed of, for example, a hard disk, but this may further include a random access memory (RAM), a read only memory (ROM) and the like. The storage unit 14 includes the program storage unit 14a, an input image storage unit 14b, a class definition storage unit 14c, and a parameter storage unit 14d.

The program storage unit 14a stores the operation program for operating each unit of the object detection device 3. The input image storage unit 14b temporarily stores the data of the image acquired by the imaging unit 2 and input to the object detection device 3, for example. Note that, when image data is input from the external terminal device or server to the object detection device 3, the input image storage unit 14b may temporarily store the above-described image data. The image input to the object detection device 3 may be directly input to the object position region detection unit 11 without being stored in the input image storage unit 14b.

The class definition storage unit 14c stores the above-described first class definition (for example, 10 classes) and second class definition (for example, three classes). Note that, the first class definition and the second class definition stored in the class definition storage unit 14c may be changed (updated) by the input unit 15 to be described later. The above-described object position region detection unit 11 may detect the position region of the object on the basis of the first class definition by accessing the class definition storage unit 14c. The class identification unit 12 may identify the class of the object on the basis of the first class definition by accessing the class definition storage unit 14c. Furthermore, the object detection result output unit 13 may output the class information of the object as the detection result of the object on the basis of the second class definition by accessing the class definition storage unit 14c.

The parameter storage unit 14d stores a parameter (weight) of each node of the CNN forming the object position region detection unit 11 and the class identification unit 12. The above-described parameter is updated every learning of the CNN and stored in the parameter storage unit 14d.

The input unit 15 is formed of, for example, a keyboard, a mouse, a touch pad, a touch panel and the like, and receives various instruction inputs by a user. The display unit 16 is a device that displays various types of information, and is formed of, for example, a liquid crystal display device. The communication unit 17 is an interface for communicating with the imaging unit 2 and an external terminal (for example, another terminal device (including a mobile terminal such as a smartphone) and a server). The communication unit 17 includes an antenna, a transmission/reception circuit, a modulation circuit, a demodulation circuit and the like in addition to an input/output port. The read unit 18 is a device that reads information recorded in a recording medium R, and is formed of, for example, a disk drive. Note that, in a case where the recording medium R is a portable nonvolatile memory, a connection port into which a connection unit of the above-described nonvolatile memory is inserted is also included in the read unit 18.

[2. Operation of Object Detection System]

Next, operations of the object detection system 1 of this embodiment at the time of learning and at the time of inference (at the time of object detection) are separately described. Note that, in the following description, the above-described 10 classes (for example, "person (with head)", "person (without head)", "car", "bus", "truck", "dog", "cat", "horse", "bear", and "bird") are defined as the first class definition, and the above-described three classes (for example, "person", "vehicle", and "animal") are defined as the second class definition.

(Operation at Time of Learning)

Figure 2:
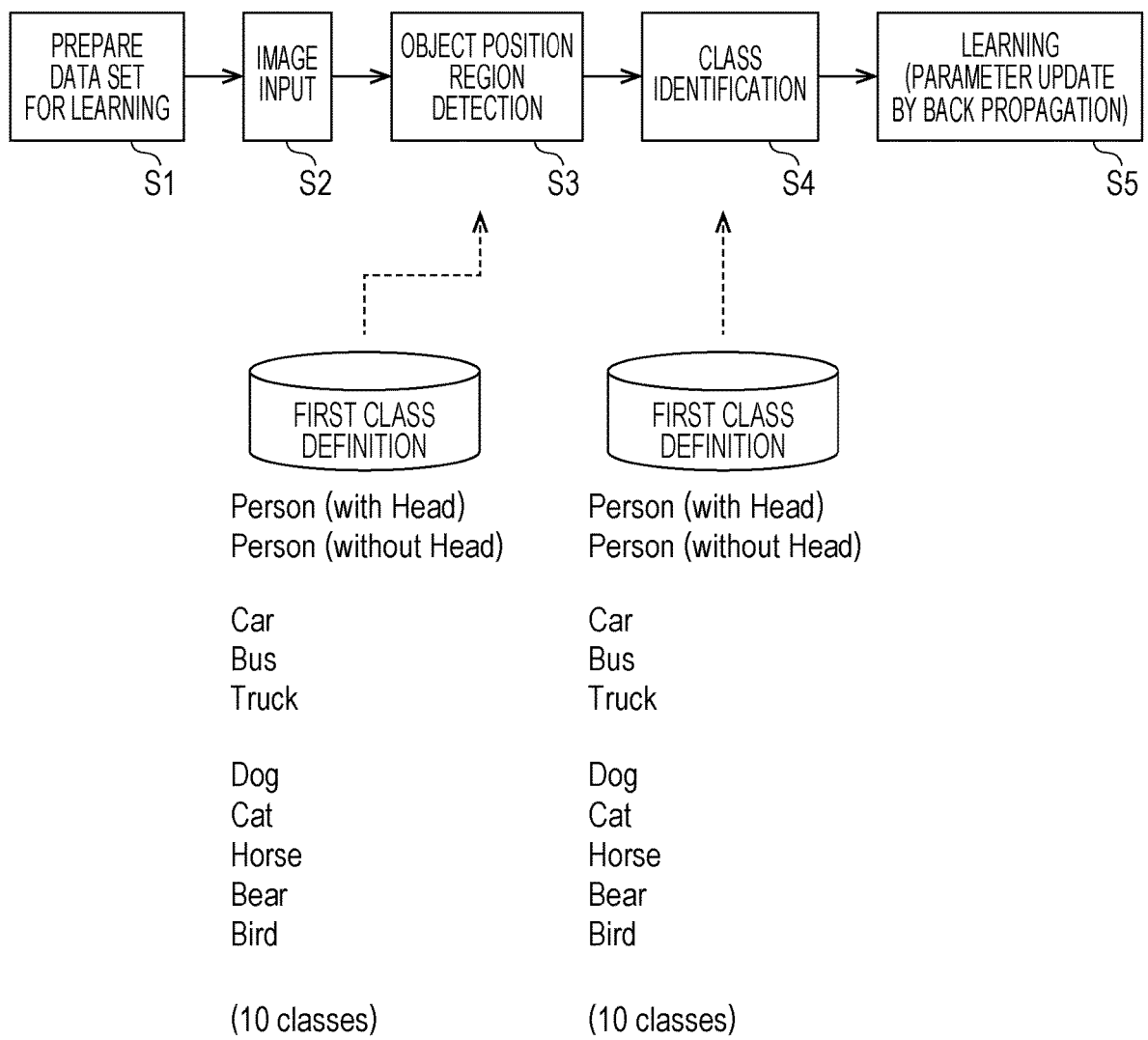
FIG. 2 is an explanatory diagram illustrating a flow of processing at the time of learning in the above-described object detection system.

FIG. 2 is an explanatory diagram illustrating a flow of processing at the time of learning in the object detection system 1. First, a data set for learning is prepared prior to the learning (S1). The above-described data set is a set of data of an image including an object and a label indicating a correct answer class of the object. Herein, the data sets including data of images of 10 classes are prepared on the basis of the above-described first class definition. Note that, a plurality of data sets may be prepared for each of the 10 classes. For example, a plurality of data sets of different images may be prepared for "person (with head)" forming one class of the 10 classes.

When the image of the data set for learning is input to the object detection device 3 (S2), the object position region detection unit 11 detects a position region of an object that might belong to any one of the 10 classes from the above-described image by neuro calculation by the CNN on the basis of the first class definition (S3). Then, the class identification unit 12 identifies a class to which the class of the object in the position region detected by the object position region detection unit 11 belongs out of the 10 classes defined in the first class definition by neuro calculation by the CNN (S4).

Thereafter, the control unit 19 updates the parameter of each node of the CNN forming the object position region detection unit 11 and the class identification unit 12 by using a back propagation method on the basis of the information output from the class identification unit 12 (S5). More specifically, this updates the parameter of each node of the object position region detection unit 11 such that the position region is detected for the object of the correct answer class (class of the first class definition) corresponding to the input image, and updates the parameter of each node of the class identification unit 12 such that the correct answer class defined in the first class definition is output as the identification result of the class of the object present in the position region detected by the object position region detection unit 11.

(Operation at Time of Inference)

Figure 3:
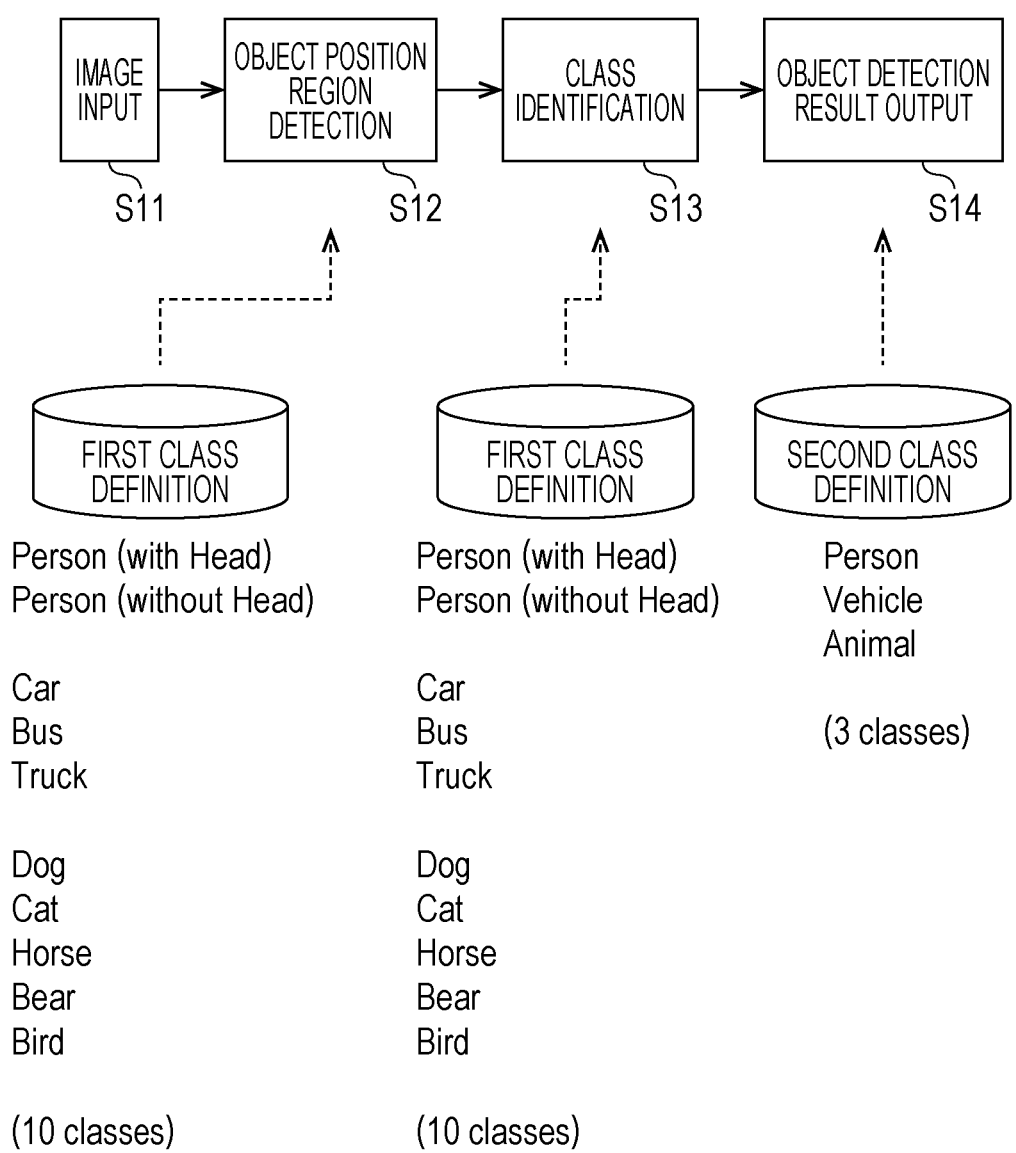
FIG. 3 is an explanatory diagram illustrating an example of processing at the time of inference in the above-described object detection system.

FIG. 3 is an explanatory diagram illustrating an example of processing at the time of inference in the object detection system 1. For example, when the image acquired by the imaging unit 2 is input to the object detection device 3 (S11), the object position region detection unit 11 detects a position region of an object that might belong to any one of the 10 classes from the above-described image on the basis of the first class definition by neuro calculation by the CNN (S12; object position region detection step).

Next, the class identification unit 12 identifies a class to which the class of the object in the position region detected by the object position region detection unit 11 belongs out of the 10 classes defined in the first class definition by neuro calculation by the CNN, and outputs information of the identified class with score (S13; class identification step).

The object detection result output unit 13 selects the class of the object with the highest score from the class information output from the class identification unit 12, and determines the class including the selected class on the basis of the second class definition. Then, the object detection result output unit 13 outputs information of the determined class and information of the position region detected by the object position region detection unit 11 as the detection result of the object (S14; object detection result output step). The detection result of the object (information of the position region and class information) output from the object detection result output unit 13 may be displayed on the display unit 16, for example, or may be transmitted to outside via the communication unit 17.

[3. Effect]

In this embodiment, the number of classes (for example, 10) defined in the first class definition is larger than the number of classes (for example, three) defined in the second class definition, and in the first class definition, a plurality of classes is finely defined. For this reason, on the basis of the first class definition, the object position region detection unit 11 may detect the position regions of the respective objects (for example, "bird" and "dog") having few common characteristics although they are common as, for example, same "animal" while distinguishing them from each other. Then, the class identification unit 12 may identify the objects (for example, "bird" and "dog") having few common characteristics in different classes on the basis of the first class definition. Therefore, the object may be detected with fine multiple classes, and a detection performance of the object may be improved.

When outputting the detection result of the object on the basis of the detection result of the object position region detection unit 11 and the identification result of the class identification unit 12, the object detection result output unit 13 outputs the class information of the object on the basis of the second class definition associated with the first class definition. Since the number of a plurality of classes defined in the second class definition is smaller than the number of classes defined in the first class definition, the object detection result output unit 13 may output, for example, information of a class in which "bird" and "dog" are put together (for example, information of "animal"). Therefore, it is possible to output the detection result of the object in units of classes fewer than those at the time of detection of the position region of the object and at the time of class identification, so that it is possible to realize the object detection device 3 and an object detection method suitable for uses and applications not focusing on the detection performance in units of fine multiple classes. For example, the object detection device 3 and the object detection method of this embodiment are suitable for uses and applications for performing investigation and analysis intended only to count passed objects and do not require detailed identification of the above-described objects in addition to monitoring and statistical investigation using an image captured by a camera installed outdoors.

In this embodiment, "person (with head)" and "person (without head)" in the first class definition are subordinate concept classes of "person" defined in the second class definition, that is, the classes obtained by subdividing "person" described above. Similarly, "car", "bus", and "truck" in the first class definition are the classes obtained by subdividing "vehicle" defined in the second class definition. Furthermore, "dog", "cat", "horse", "bear", and "bird" in the first class definition are classes obtained by subdividing "animal" defined in the second class definition.

In this manner, since the first class definition is defined by subdividing each class defined in the second class definition, it is possible to detect the object with fine multiple classes on the basis of the first class definition. As a result, the detection performance of the object may be reliably improved. The object detection result output unit 13 may put two or more classes (for example, "dog" and "bird") identified on the basis of the first class definition together into one class (for example, "animal") defined in the second class definition, and output this information as the class information. Therefore, the object detection result output unit 13 may reliably output the detection result of the objects in units of fewer classes than those at the time of detection of the position region of the object and at the time of class identification.

In addition, "person (with head)" and "person (without head)" in the first class definition have a common characteristic as "person". In addition, "car", "bus", and "truck" in the first class definition have a common characteristic as "vehicle". Furthermore, "dog", "cat", "horse", "bear", and "bird" in the first class definition have a common characteristic as "animal".

From this, it may be said that the first class definition is defined by subdividing each class defined in the second class definition into different classes having the common characteristic. In this case, the object position region detection unit 11 may detect the respective position regions of the objects that might belong to different classes having the common characteristic while distinguishing them from each other on the basis of the first class definition. The class identification unit 12 may separately identify different classes having the common characteristic on the basis of the first class definition. Therefore, it becomes possible to detect the objects in a distinguishing manner even between the different classes having the common characteristic, and reliably improve the detection performance of the object.

In this embodiment, the object position region detection unit 11 and the class identification unit 12 are formed of the neural network. In this case, by allowing the object position region detection unit 11 and the class identification unit 12 to perform machine learning, it becomes possible to detect the position region of the object by neuro calculation on the basis of the input image, and to identify the class of the object by neuro calculation. By updating the parameter (weight of each node) of the neural network by the machine learning, it becomes possible to improve detection accuracy of the position region of the object (detection accuracy of presence or absence of the object) and accuracy of the class identification.

In this embodiment, the class identification unit 12 identifies the class after the object position region detection unit 11 detects the position region (refer to FIG. 3). In this case, since the class identification unit 12 may identify the class of the object the position region of which is detected by the object position region detection unit 11 (since the class may be identified only for something like the object), the detection performance of the object may be further improved.

[4. Regarding Subdivision of Classes by Learning]

Figure 4:
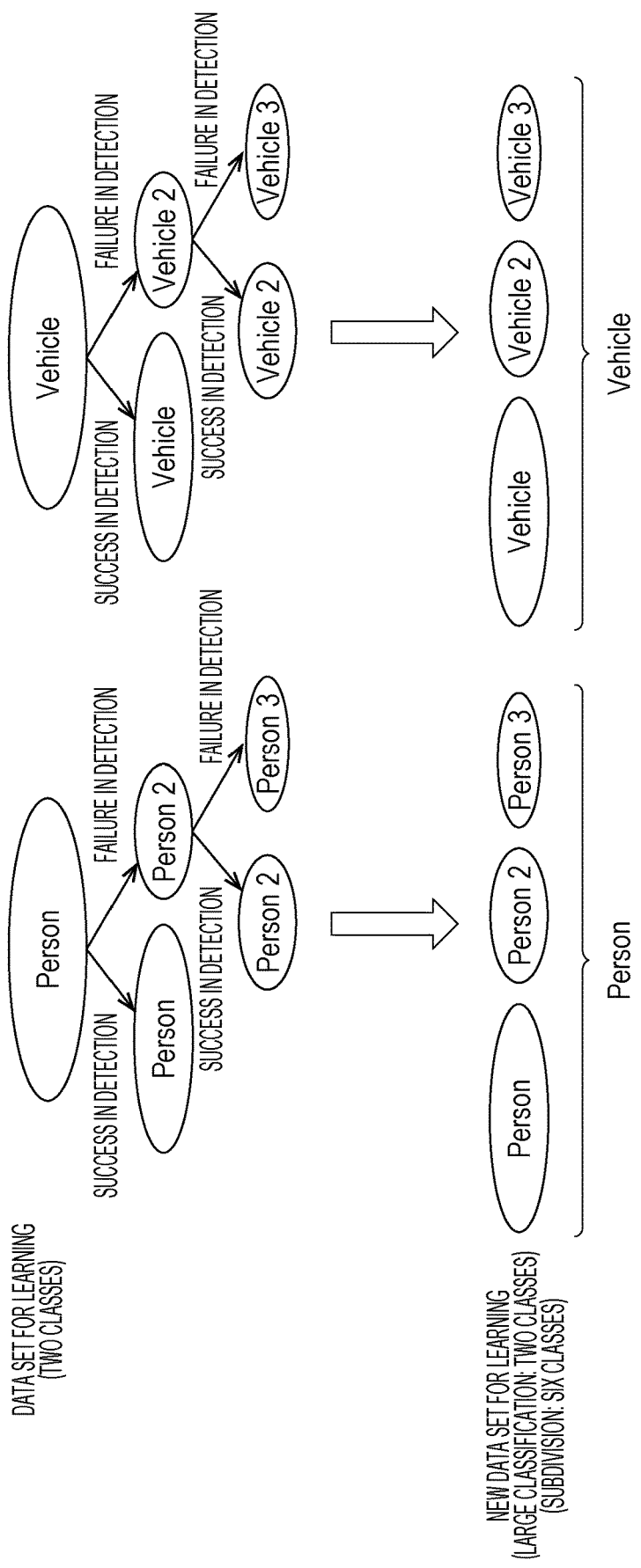
FIG. 4 is an explanatory diagram schematically illustrating a hierarchical structure of each class.

FIG. 4 is an explanatory diagram schematically illustrating a hierarchical structure of each class defined in the second class definition. The first class definition may be defined on the basis of the hierarchical structure of each class defined in the second class definition. In the drawing, an example is illustrated in which the above-described hierarchical structure is realized by subdividing each class defined in the second class definition on the basis of the identification result of the class identification unit 12 at the time of learning, and each class in the first class definition is defined on the basis of the hierarchical structure.

More specifically, assume that each class defined in the second class definition is two classes of "person" and "vehicle". For each of these classes, the data set for learning (image+correct answer label) is prepared. At that time, a plurality of data sets of different images is prepared for each class. Then, the object position region detection unit 11 and the class identification unit 12 are allowed to learn by the above-described method. That is, for example, the image of the data set of "person" is input, the object position region detection unit 11 detects the position region of the object and the class identification unit 12 performs the class identification, and the identification result (score of the identified class) is output. Then, the parameter of each node of the object position region detection unit 11 and the class identification unit 12 is updated by using the back propagation method.

At that time, in the data set of "person", in a case where the class identified by the class identification unit 12 (class with the score equal to or higher than a threshold) matches the class (for example, "person") indicated by the correct answer label, it is determined that the object detection is succeeded, and the class identified by the class identification unit 12 (for example, "person") is left as it is. In contrast, in the data set of "person", in a case where the class identified by the class identification unit 12 (class with the score equal to or higher than a threshold) does not match the class (for example, "person") indicated by the correct answer label, it is determined that the object detection is failed, and the class identified by the class identification unit 12 is set as a new class (for example, "person 2"). Then, the parameter of each node of the object position region detection unit 11 and the class identification unit 12 is updated by the back propagation method so that the object included in the image of the used data set (the image in which the detection of the object is failed) is identified as "person 2".

Next, the image of the data set of "person 2" is input, the object position region detection unit 11 detects the position region of the object and the class identification unit 12 performs the class identification, the identification result (score of the identified class) is output, and the processing similar to that described above is performed. That is, in a case where the class identified by the class identification unit 12 (class with the score equal to or higher than a threshold) matches the class (for example, "person 2") indicated by the correct answer label, it is determined that the object detection is succeeded, and the class identified by the class identification unit 12 (for example, "person 2") is left as it is. In contrast, in the data set of "person 2", in a case where the class identified by the class identification unit 12 (class with the score equal to or higher than a threshold) does not match the class (for example, "person 2") indicated by the correct answer label, it is determined that the object detection is failed, and the class identified by the class identification unit 12 is set as a new class (for example, "person 3"). Then, the parameter of each node of the object position region detection unit 11 and the class identification unit 12 is updated by the back propagation method so that the object included in the image of the used data set (the image in which the detection of the object is failed) is identified as "person 3".

By the above-described processing, the class of "person" is subdivided into the classes of "person" and "person 2" on the basis of the identification result by the class identification unit 12, and the class of "person 2" is further subdivided into the classes of "person 2" and "person 3" on the basis of the identification result by the class identification unit 12. As a result, a hierarchical structure in which "person" is in an uppermost layer is realized. That is, on the basis of the identification result by the class identification unit 12, the hierarchical structure in which "person" in the uppermost layer class is subdivided into lower layer classes ("person", "person 2", and "person 3") is obtained.

Note that, as for "vehicle" also, the object position region detection unit 11 and the class identification unit 12 are allowed to learn in the manner similar to that described above by using the data set of "vehicle", so that a hierarchical structure of "vehicle" may be obtained on the basis of the identification result by the class identification unit 12. That is, it is possible to obtain the hierarchical structure in which "vehicle" in the uppermost layer class is subdivided into lower layer classes ("vehicle", "vehicle 2", and "vehicle 3") on the basis of the identification result by the class identification unit 12.

Therefore, by defining "person" and "vehicle" as each class in the second class definition, it is possible to define the first class definition on the basis of the hierarchical structures of "person" and "vehicle" defined in the second class definition. That is, the classes belonging to the layers other than the uppermost layers of the hierarchical structures of the two classes ("person" and "vehicle") defined in the second class definition, that is, "person", "person 2", "person 3", "vehicle", "vehicle 2", and "vehicle 3" (six classes) may be defined as the first class definition.

In this manner, by defining the first class definition on the basis of the hierarchical structure of each class defined in the second class definition, it becomes possible to reliably set the first class definition finely with multiple classes associated with the second class definition. As a result, the detection of the position region of the object and the class identification by the object position region detection unit 11 and the class identification unit 12, respectively, may be reliably performed with fine multiple classes on the basis of the first class definition. The object detection result output unit 13 may reliably reduce the number of classes output as the detection result of the object by outputting information of the uppermost layer class of the above-described hierarchical structure on the basis of the second class definition.

As described above, by subdividing each class defined in the second class definition on the basis of the identification result by the class identification unit 12 at the time of learning and defining the first class definition, it becomes possible to reliably improve the identification accuracy when the class identification unit 12 identifies the class on the basis of the first class definition at the time of inference. That is, in the above-described example, at the time of inference, it is possible to reliably and accurately identify which of "person", "person 2", and "person 3" the person included in the input image is, or which of "vehicle", "vehicle 2", and "vehicle 3" the vehicle included in the input image is.

As described above, by defining the first class definition by subdividing each class defined in the second class definition into a plurality of classes including the class (for example, "person" and "person 2") for which the identification at the time of learning is succeeded and the class (for example, "person 3") newly assigned after the failure in identification at the time of learning, it becomes possible to determine (identify) whether the object belongs to the class (for example, "person 3") on the basis of the first class definition at the time of inference also for the class (for example, "person 3") for which the identification is failed at the time of learning.

[5. Variation]

Figure 5:
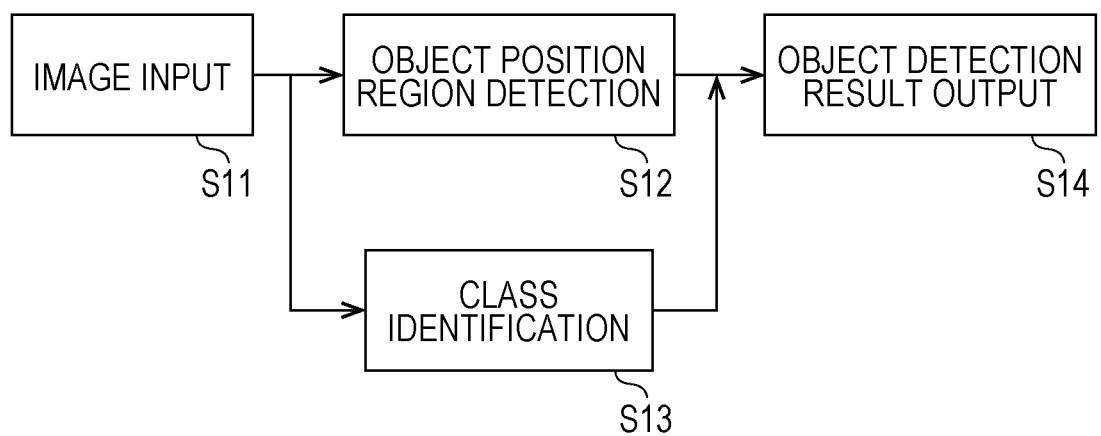
FIG. 5 is an explanatory diagram illustrating another example of processing at the time of inference in the above-described object detection system.

FIG. 5 is an explanatory diagram illustrating another example of processing at the time of inference in the object detection system 1. FIG. 4 is similar to FIG. 3 except that the class identification unit 12 identifies the class of the object included in the image simultaneously with the detection of the position region by the object position region detection unit 11. In this configuration, the object for which the class identification unit 12 identifies the class is not an object present in a specific position region in the image but an object present somewhere in the input image; however, in this case also, it becomes possible to identify the class of the object (object the position region of which is not specified) located somewhere in the input image at the time of inference by allowing the class identification unit 12 to perform machine learning in advance.

In this manner, by simultaneously performing the detection of the position region by the object position region detection unit 11 and the identification of the class of the object by the class identification unit 12, it becomes possible to perform quick object detection (output of the detection result) as compared with a case of continuously performing the processing as illustrated in FIG. 3.

[6. Program and Recording Medium]

The object detection device 3 of this embodiment described above may be formed of, for example, a computer (PC) in which a predetermined program (application software) is installed. By reading and executing the above-described program by the computer (for example, the control unit 19 as the CPU), it becomes possible to operate each unit of the object detection device 3 to execute each processing (each step) described above. Such program is acquired by being externally downloaded via, for example, a network and stored in the program storage unit 14a. The above-described program may be recorded in a computer-readable recording medium R such as a compact disk-read only memory (CD-ROM), for example, and the computer may read the above-described program from the recording medium R and store the same in the program storage unit 14a.

[7. Others]

The object detection device, the object detection method, the program, and the recording medium described in each of the above-described embodiments may be expressed as follows.

1. An object detection device provided with:
   an object position region detection unit that detects, from an input image, a position region of an object included in the image on the basis of a first class definition in which a plurality of classes is defined in advance;
   a class identification unit that identifies a class out of the plurality of classes to which the object belongs on the basis of the first class definition; and
   an object detection result output unit that outputs a detection result of the object on the basis of a detection result of the object position region detection unit and an identification result of the class identification unit, in which
   the object detection result output unit outputs class information of the object as the detection result of the object on the basis of a second class definition in which a plurality of classes is defined in advance, the second class definition associated with the first class definition, and
   the number of classes defined in the second class definition is smaller than the number of classes defined in the first class definition.

2. The object detection device according to 1 described above, in which the first class definition is defined by subdividing each class defined in the second class definition.

3. The object detection device according to 2 described above, in which the first class definition is defined on the basis of a hierarchical structure of each class defined in the second class definition.

4. The object detection device according to 2 or 3 described above, in which the first class definition is defined by subdividing each class defined in the second class definition into different classes having a common characteristic.

5. The object detection device according to any one of 1 to 4 described above, in which each of the object position region detection unit and the class identification unit is formed of a neural network.

6. The object detection device according to 5 described above, in which the first class definition is defined by subdividing each class defined in the second class definition on the basis of the identification result of the class identification unit at the time of learning.

7. The object detection device according to 6 described above, in which the first class definition is defined by subdividing each class defined in the second class definition into a plurality of classes including a class for which identification at the time of learning is succeeded and a class newly allocated after failure of the identification at the time of learning.

8. The object detection device according to any one of 1 to 7 described above, in which the class identification unit identifies the class after the object position region detection unit detects the position region.

9. The object detection device according to any one of 1 to 7 described above, in which the class identification unit identifies the class simultaneously with the detection of the position region by the object position region detection unit.

10. An object detection method provided with:
an object position region detection step of detecting, from an input image, a position region of an object included in the image on the basis of a first class definition in which a plurality of classes is defined in advance;
a class identification step of identifying a class out of the plurality of classes to which the object belongs on the basis of the first class definition; and
an object detection result output step of outputting a detection result of the object on the basis of a detection result of the object position region detection step and an identification result of the class identification step, in which
at the object detection result output step, class information of the object is output as the detection result of the object on the basis of a second class definition in which a plurality of classes is defined in advance, the second class definition associated with the first class definition, and
the number of classes defined in the second class definition is smaller than the number of classes defined in the first class definition.

11. The object detection method according to 10 described above, in which the first class definition is defined by subdividing each class defined in the second class definition.

12. The object detection method according to 11 described above, in which the first class definition is defined on the basis of a hierarchical structure of each class defined in the second class definition.

13. The object detection method according to 11 or 12 describe above, in which the first class definition is defined by subdividing each class defined in the second class definition into different classes having a common characteristic.

14. The object detection method according to any one of 10 to 13 described above, provided with:
detecting the position region by neuro calculation at the object position region detection step; and
identifying the class by neuro calculation at the class identification step.

15. The object detection method according to 14 described above, in which the first class definition is defined by subdividing each class defined in the second class definition on the basis of the identification result of the class identification step at the time of learning.

16. The object detection method according to 15 described above, in which the first class definition is defined by subdividing each class defined in the second class definition into a plurality of classes including a class for which identification at the time of learning is succeeded and a class newly allocated after failure of the identification at the time of learning.

17. The object detection method according to any one of 10 to 16 described above, in which the class identification step is performed after the object position region detection step.

18. The object detection method according to any one of 10 to 16 described above, in which the class identification step is performed simultaneously with the object position region detection step.

19. A program for allowing a computer to execute the object detection method according to any one of 10 to 18 described above.

20. A computer-readable recording medium in which the program according to 19 described above is recorded.

An object detection system of this embodiment may also be expressed as follows.

21. An object detection system comprising:
an object detection device according to any one of 1 to 9 described above; and
an imaging unit that acquires the image input to the object detection device.

Although the embodiments of the present invention have been described above, the scope of the present invention is not limited thereto, and may be expanded or modified without departing from the gist of the invention.

INDUSTRIAL APPLICABILITY

The present invention may be used in a system that detects, from an input image, an object included in the image.

REFERENCE SIGNS LIST

1 Object detection system
2 Imaging unit
3 Object detection device
11 Object position region detection unit
12 Class identification unit
13 Object detection result output unit

The invention claimed is:
1. An object detection device comprising:
an object position region detector that detects, from an input image, a position region of an object included in the image on the basis of a first class definition in which a plurality of classes is defined in advance;
a class identifier that identifies a first class out of the plurality of classes to which the object belongs on the basis of the first class definition; and
a hardware processor that outputs a detection result of the object on the basis of a detection result of the object position region detector and an identification result of the class identifier, wherein
the hardware processor
determines, based on the first class identified by the class identifier, a second class that is a superordinate class associated with the first class on the basis of a second class definition in which a plurality of classes is defined in advance, the second class definition associated with the first class definition, and
outputs class information of the object as the detection result of the object, the class information indicating the second class, and the number of classes defined in the second class definition is smaller than the number of classes defined in the first class definition.

2. The object detection device according to claim 1, wherein the first class definition is defined by subdividing each class defined in the second class definition.

3. The object detection device according to claim 2, wherein the first class definition is defined on the basis of a hierarchical structure of each class defined in the second class definition.

4. The object detection device according to claim 2, wherein the first class definition is defined by subdividing each class defined in the second class definition into different classes having a common characteristic.

5. The object detection device according to claim 1, wherein each of the object position region detector and the class identifier is formed of a neural network.

6. The object detection device according to claim 5, wherein the first class definition is defined by subdividing each class defined in the second class definition on the basis of the identification result of the class identifier at the time of learning.

7. The object detection device according to claim 6, wherein the first class definition is defined by subdividing each class defined in the second class definition into a plurality of classes including a class for which identification at the time of learning is succeeded and a class newly allocated after failure of the identification at the time of learning.

8. The object detection device according to claim 1, wherein the class identifier identifies the class after the object position region detector detects the position region.

9. The object detection device according to claim 1, wherein the class identifier identifies the class simultaneously with the detection of the position region by the object position region detector.

10. An object detection method comprising:
 detecting, from an input image, a position region of an object included in the image on the basis of a first class definition in which a plurality of classes is defined in advance;
 identifying a first class out of the plurality of classes to which the object belongs on the basis of the first class definition; and
 outputting a detection result of the object on the basis of a detection result of the detecting and an identification result of the identifying, wherein
 the outputting includes,
  determining, based on the first class identified by the identifying, a second class that is a superordinate class associated with the first class on the basis of a second class definition in which a plurality of classes is defined in advance, the second class definition associated with the first class definition, and
  outputting class information of the object as the detection result of the object, the class information indicating the second class, and
 the number of classes defined in the second class definition is smaller than the number of classes defined in the first class definition.

11. The object detection method according to claim 10, wherein the first class definition is defined by subdividing each class defined in the second class definition.

12. The object detection method according to claim 11, wherein the first class definition is defined on the basis of a hierarchical structure of each class defined in the second class definition.

13. The object detection method according to claim 11, wherein the first class definition is defined by subdividing each class defined in the second class definition into different classes having a common characteristic.

14. The object detection method according to claim 10, comprising:
 detecting the position region by neuro calculation at the detecting; and
 identifying the first class by neuro calculation at the identifying.

15. The object detection method according to claim 14, wherein the first class definition is defined by subdividing each class defined in the second class definition on the basis of the identification result of the identifying at the time of learning.

16. The object detection method according to claim 15, wherein the first class definition is defined by subdividing each class defined in the second class definition into a plurality of classes including a class for which identification at the time of learning is succeeded and a class newly allocated after failure of the identification at the time of learning.

17. The object detection method according to claim 10, wherein the identifying is performed after the detecting.

18. The object detection method according to claim 10, wherein the identifying is performed simultaneously with the detecting.

19. A non-transitory recording medium storing a computer readable program for allowing a computer to execute the object detection method according to claim 10.

* * * * *